(12) United States Patent
Edlund Tjernberg et al.

(10) Patent No.: US 11,794,967 B2
(45) Date of Patent: Oct. 24, 2023

(54) TETHER

(71) Applicant: b.box for kids developments Pty Ltd, Mulgrave (AU)

(72) Inventors: Lisa Edlund Tjernberg, Mulgrave (AU); Sylvain Jacques Amatoury, Mulgrave (AU)

(73) Assignee: b.box for kids developments Pty Ltd, Notting Hill (AU)

( * ) Notice: Subject to any disclaimer, the term of this patent is extended or adjusted under 35 U.S.C. 154(b) by 398 days.

(21) Appl. No.: 17/287,610

(22) PCT Filed: Oct. 24, 2019

(86) PCT No.: PCT/AU2019/051167
§ 371 (c)(1),
(2) Date: Apr. 22, 2021

(87) PCT Pub. No.: WO2020/093086
PCT Pub. Date: May 14, 2020

(65) Prior Publication Data
US 2022/0112013 A1 Apr. 14, 2022

(30) Foreign Application Priority Data

Nov. 8, 2018 (AU) ................................ 2018260900

(51) Int. Cl.
*B65D 63/10* (2006.01)
*A61J 9/06* (2006.01)
*F16M 13/02* (2006.01)

(52) U.S. Cl.
CPC ............ *B65D 63/10* (2013.01); *A61J 9/0661* (2015.05); *F16M 13/02* (2013.01)

(58) Field of Classification Search
CPC ................................ B65D 63/10; F16M 13/02
See application file for complete search history.

(56) References Cited

U.S. PATENT DOCUMENTS

| | | | |
|---|---|---|---|
| 6,212,688 B1 * | 4/2001 | Leslie | A41D 19/0041 2/160 |
| 9,474,357 B2 | 10/2016 | Vohs | |
| 2006/0163301 A1 | 7/2006 | Rhodes et al. | |
| 2007/0175408 A1 | 8/2007 | Spencer | |
| 2008/0127461 A1 * | 6/2008 | Linden | A45F 5/02 24/302 |

(Continued)

*Primary Examiner* — Robert Sandy
(74) *Attorney, Agent, or Firm* — Young Basile Hanlon & MacFarlane, P.C.

(57) ABSTRACT

A tether for connecting two different objects together has first and second elongate and flexible end portions having proximal and distal ends, and an elongate and flexible intermediate portion. The intermediate portion is releasably connectable with the first and second end portions, by the intermediate portion having connectors at either end and the first and second end portions having connectors at respective proximal ends to form first and second safety breakaways. The connections of the first and second safety breakaways, are made in-line with the general lengthwise axis of the tether. The first and second end portions are arranged for connection to a respective object. The safety breakaways between the intermediate portion and the first and second end portions are releasable at a predetermined release load.

19 Claims, 4 Drawing Sheets

(56) References Cited

U.S. PATENT DOCUMENTS

| | | | |
|---|---|---|---|
| 2008/0230658 A1* | 9/2008 | Waits | A47D 15/00 248/104 |
| 2009/0000083 A1* | 1/2009 | Richard | A45F 5/00 24/302 |
| 2011/0312233 A1 | 12/2011 | Starck, Jr. et al. | |
| 2017/0119106 A1 | 5/2017 | Leslie | |

* cited by examiner

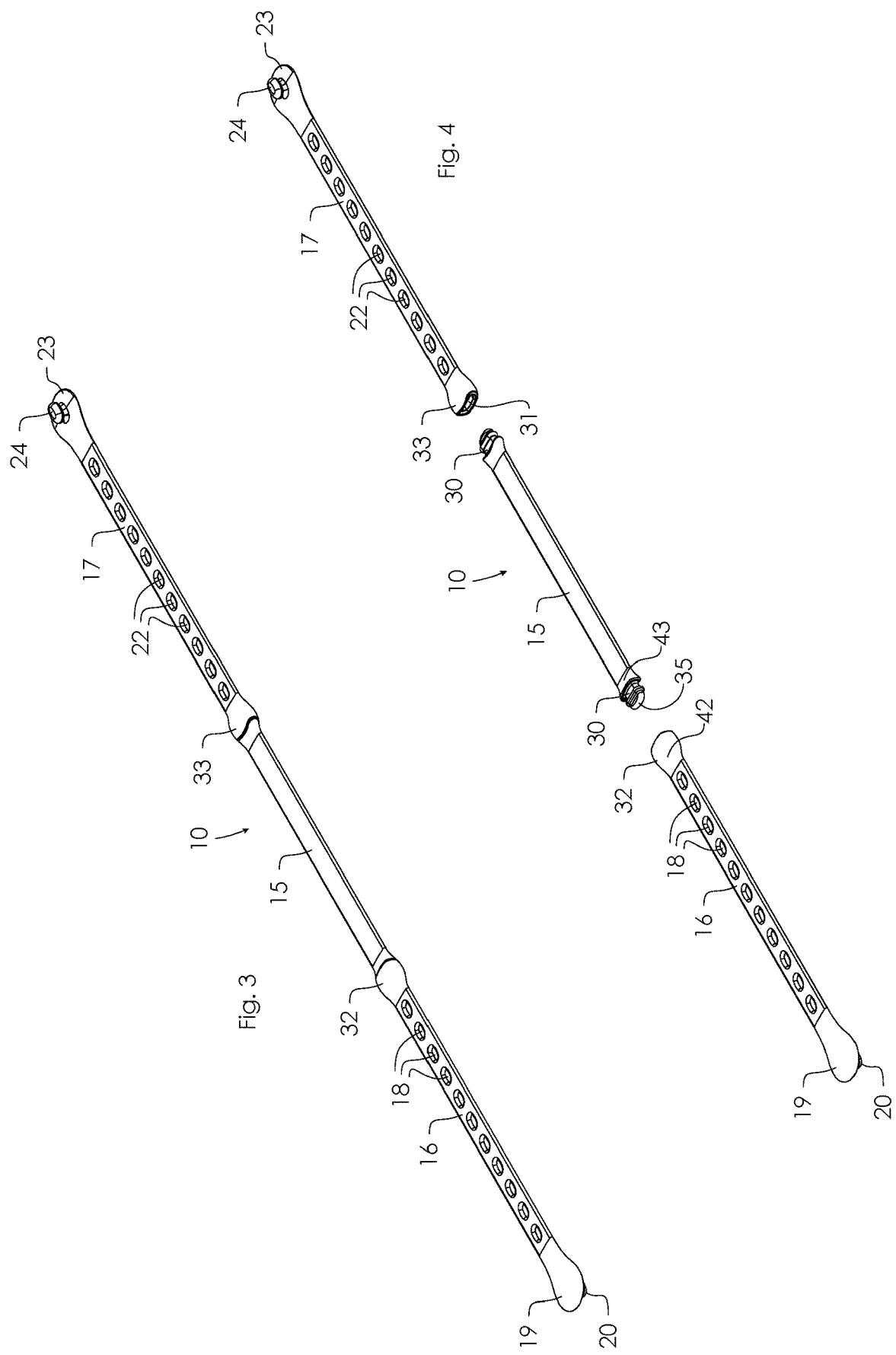

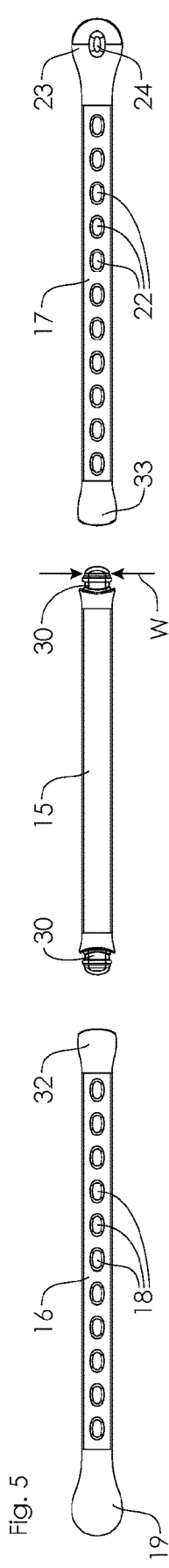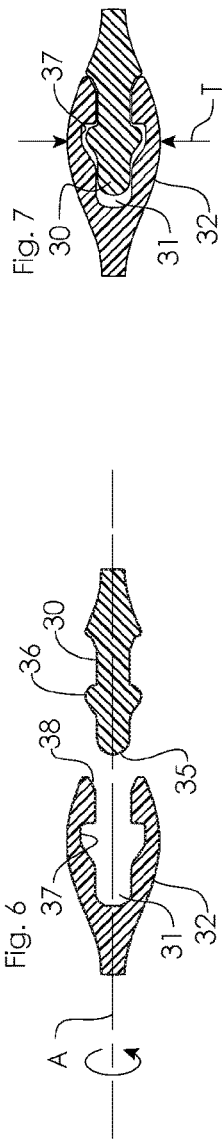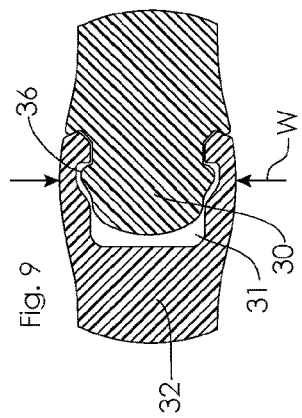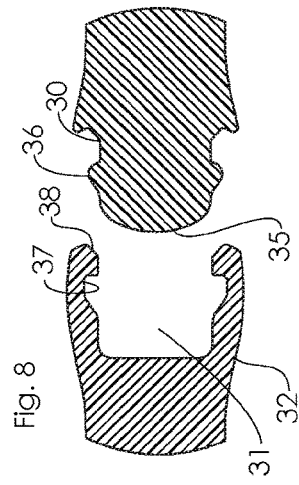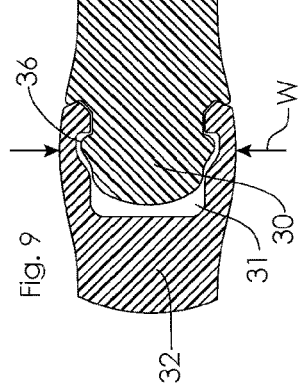

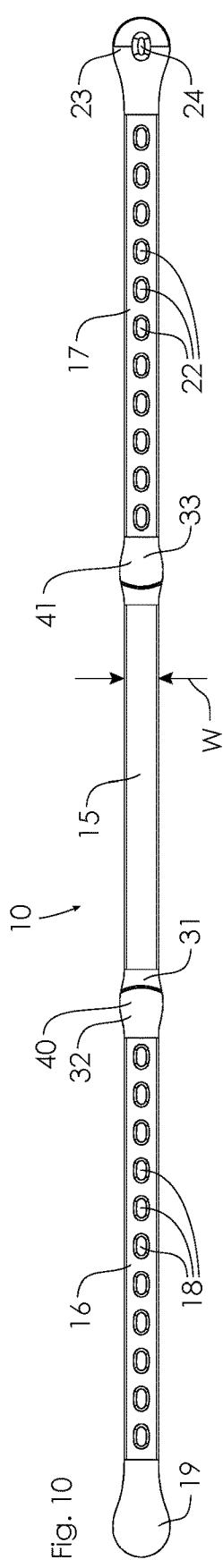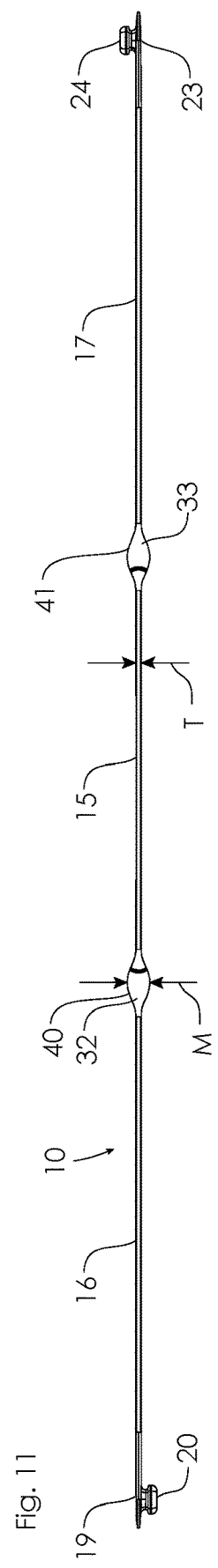

TETHER

PRIORITY CROSS-REFERENCE

This application is a national stage 371 application of PCT/AU2019/051167, filed on Oct. 24, 2019, which claims priority to Australian Provisional Patent Application No. 2018260900, filed Nov. 8, 2018 the contents of which are incorporated into this specification by this reference.

TECHNICAL FIELD

The present invention relates to a tether and in particular to a tether which has a safety function relevant to use of the tether with infants and toddlers. The tether of the invention is thus a tether that can be used to connect two objects together, such as an infant's cup to a pram, and the tether of the invention includes a safety function intended so that the tether can be safely used with infants against encircling and constricting infant body parts, such as the head and neck.

It will be convenient to describe the invention in relation to its use with infants and infant products, but it should be appreciated that the invention could have wider application, such as in relation to the elderly or infirm, or in relation to the connection of any two suitable objects together.

BACKGROUND OF INVENTION

The discussion of the background to the invention that follows is intended to facilitate an understanding of the invention. However, it should be appreciated that the discussion is not an acknowledgment or admission that any aspect of the discussion was part of the common general knowledge as at the priority date of the application.

Infants and toddlers are often seated in high-chairs, bassinets, and prams/strollers, with access to toys and eating and drinking items. The nature of infants and toddlers is such that these toys or eating and drinking items can be knocked or pushed inadvertently to the floor, or can be deliberately pushed or thrown. Indeed, some infants and toddlers find it entertaining to deliberately throw or drop items to the floor, much to the annoyance of their carers, as the dropped items need to be located and collected, and often returned to the infant or toddler, who might again throw or drop the item.

For the above reasons, tethers can be used to secure an item such as to attach it to the high-chair, pram or other device in or at which the infant or toddler is seated. As an example, cups generally known as "sippy cups", that are a closed top drinking vessel with a drinking straw, are used with infants from about 4 months of age and a tether can connect to the cup and to a high-chair for example, so that if the cup is knocked or thrown from the high-chair, it will simply dangle from the tethered connection, making it easy to locate and preventing it from landing on the floor, which might require the cup to be cleaned or sterilised. Tethers can also prevent the loss of an item if it is dropped without being noticed, such as from a stroller. Tethers for other eating and drinking items, or for toys, can operate in the same manner.

A potential difficulty with the use of tethers, is that they can wrap around body parts of an infant or toddler simply through the act of playing with a tethered toy or manipulating tethered eating or drinking item. Without sufficient dexterity to unwrap or unravel the tether, it can remain wrapped around the body part and the effect of this can range from discomfort if the tether is wrapped around the leg or arm of the infant or toddler for example, to danger if the tether wraps around the neck or head.

The above deficiency with tethers has been recognised and one solution has been proposed via U.S. Pat. No. 9,474,357 in the name of Lil' Sidekick, Inc. The tether disclosed in that patent is of a unitary structure and includes ends that fold over to connect to openings formed in the body of the tether, so as to form loops at either end of the tether that can connect to two different objects, such as a cup and a high-chair. The connections between the ends of the tether and the body of the tether include "breakaway" sections that are weaker than other sections of the tether, so that the tether can break at those weakened sections if a sufficient load is applied to the tether. The breakaway sections allow the tether to break when the infant or toddler pulls on the tether, such as to relieve discomfort experienced if the tether has wrapped around a body part for example, thus relieving discomfort or danger by the breakage of the tether.

While prior art tethers already exist, the present applicant has identified a need in the marketplace for an improved or at least alternative tether that has an aesthetic appearance, is easy and effective to operate, and which includes suitable safety against constriction, discomfort and strangulation at least for infants and toddlers.

SUMMARY OF INVENTION

According a first form of the present invention there is provided a tether for connecting two different objects together, the tether having;
  a. first and second elongate and flexible end portions having proximal and distal ends, and
  b. an elongate and flexible intermediate portion,
  c. the intermediate portion being releasably connectable with the first and second end portions by the intermediate portion having connectors at either end and the first and second end portions having connectors at respective proximal ends which connect to form first and second safety breakaways, the connections of the first and second safety breakaways being made in-line with the general lengthwise axis of the tether,
  d. the first and second end portions being arranged for connection to a respective object,
  e. whereby the safety breakaways between the respective male and female connectors are releasable at a predetermined release load.

A tether according to the present invention includes safety breakaways that are connection portions between the intermediate portion and the respective first and second end portions that release at a predetermined load. The expression "safety breakaway" is an expression known in the art and will be used hereinafter to describe the connection that is made between the intermediate portion and the respective first and second end portions.

The safety breakaways are releasable at a predetermined release load that, for the purposes of the use of the tether of the invention with infants and toddlers is a load that is equivalent to the load that an infant or toddler might exert or the tether if the tether becomes entangled about a body part, or if one of the objects to which the tether is attached becomes caught, such as a cup being caught in the wheels of a pram or stroller, or a predefined load defined by relevant safety standards. The safety breakaways can be configured to release under different release loads depending on the application of the tether so that for an infant or toddler, the release load will be low, while for an older child, the release load could be higher.

The tether thus has two connection points that are releasable at the predetermined release load and the intention and expectation is that at least one of the connections will release upon the release load being applied to the tether. Indeed both connections could release but typically the release of only one of the breakaways will be sufficient to terminate any uncomfortable or dangerous entanglement that has occurred with the tether. While other tethers already have a release function (U.S. Pat. No. 9,474,357 for example), the design of the tether of the present invention to have connections forming the safety breakaways being made in-line with the general lengthwise axis of the tether, provides, in applicant's view, a more reliable release function for the breakaways. In other tethers, such as the tether of U.S. Pat. No. 9,474,357, the male connector connects with the female connector laterally to the lengthwise axis of the tether and this acts as a natural resistance to release of the mating connection.

Moreover, the breakaways in U.S. Pat. No. 9,474,357 are located at the ends of the tether and so if the portion between the ends is long enough, then the tether can wrap around a body part without the breakaways coming under tension. The present invention provides breakaways at the two points at which the intermediate portion connects to the first and second end portions, which points are inboard of the ends of the tether.

The intermediate portion can have male connectors at either end and the first and second end portions can have female connectors at respective proximal ends which connect together to form the first and second safety breakaways. Alternatively, the first and second end portions can have male connectors at respective proximal ends and the intermediate portion can have male connectors. Either arrangement is acceptable.

The tether of the invention can be formed from any suitable material. Suitable materials include thermoplastic elastomers (TPE), rubbers, thermoplastic polyurethane (TPU), silicone or other rubber like materials. While some forms of the invention can include portions formed of different materials, in preferred forms of the invention, each of the first and second end portions and the intermediate portion are formed from the same material. This advantageously provides that the portions of the tether that connect together have the same physical characteristics, so that differing characteristics (such as thermal expansion and friction coefficient for example) do not affect the performance of the tether.

The first and second end portions are arranged or configured for connection to a respective object, with the objects being different objects. The different objects can actually be the same type of object, ie two of the same infant cup, but more likely, the objects will be quite different. For example, a first object can be the frame of a pram or high-chair, while the second object can be a drinking cup or toy. While any suitable arrangement or configuration can be employed, in some forms of the invention, the distal end of one or both of the first and second end portions is sufficiently flexible to fold over and connect to a portion of the tether which is inboard of the distal end. This allows a loop to be formed which can be placed around an object, again such as the frame of a pram or a cup or toy, or looped through an object for connection to the object.

In forms of the invention as described above, the tether can include a plurality of openings formed inboard of the distal end of one or each of the first and second end portions and at least one of the distal ends can include a male connector for insertion in to an opening of the plurality of openings to thereby connect the distal end or ends to the portion of the tether in which the selected opening is provided. The preference is that each of the distal ends includes a male connector, although in other forms of the invention, only one of the distal ends includes the male connector and a different form of connection is provided at the distal end of the other of the first and second end portions. For example, it might be that the tether of the invention is to be customised for use with a particular object such as a cup or a particular toy, for connection to a different object which is not specified, but could be a high-chair or pram. This form of the invention might be relevant when the tether is sold with a particular product for use with that product. In this form of the invention, a distal end of one of the first and second end portions might be a snap connector for example for snap connection with a complementary connector provided on the specific product for which the tether is to be used. Alternatively, a distal end of one of the first and second end portions might be a loop of fixed diameter.

The safety tether of the invention can thus be customised for connection to particular products, or can be provided for general use by different configurations of the first and second end portions.

Where connection of the distal end of one or both of the first and second end portions is by a male connector being received within an opening, the male connector can be formed at the distal end of one or both of the first and second end portions, while the openings can be formed within the tether inboard of the distal ends. These openings can be provided in just one of the first and second end portions, being the end portion to which the male connector is provided, or they can be provided in both of the first and second end portions, or they can be provided in the intermediate portion in addition to or alternatively to one or both of the first and second end portions.

In alternative forms of the invention, the tether can include a plurality of male connectors formed inboard of the distal end of one or both of the first and second end portions and one or both of the distal ends can include an opening for receiving a male connector. This is the reverse of the arrangement discussed above in which a plurality of openings is provided and while an arrangement with a plurality of male connectors is possible, it is expected that the preference would be to adopt the arrangement in which a plurality of openings is provided.

As the tether is intended to be an elongate item, which is of generally constant width, the plurality of openings or the plurality of male connectors would ordinarily be provided in a line lengthwise of the tether. In respect of the plurality of openings, these can be of any suitable shape, but in prototypes tested to date, the openings are longer than wide in the lengthwise direction of the tether. In some forms of the invention, the openings of the plurality of openings are generally oval.

As indicated above, a safety tether according to the invention will typically be elongate and of generally constant width. It is also expected that the tether will be of generally constant thickness. In this respect, the first and second end portions, between the proximal and distal ends can thus be of generally constant width and thickness although the actual proximal and distal ends can have a different configuration. For example, the distal end of one or both of the first and second end portions can have a greater width than the width of the end portions between the proximal and distal ends as this can assist a person connecting or disconnecting the distal end to or from a portion of the tether inboard of the distal end. That is, the greater width of the distal ends can provide a finger gripping or pressing portion. In these forms of the invention, the distal end can be formed as a generally round end and can be of constant thickness, whereby the diameter of the distal end is greater than the width of the end portion inboard of the distal end. The distal end can be formed in a different shape, such as square, oval or hexagonal and can be of reducing thickness towards edges thereof.

In forms of the invention in which the intermediate portion or the first and second end portions have male connectors, those connectors can have a width dimension that is greater than a thickness dimension and the female connectors of the first and second end portions can include openings for accepting the male connectors that are generally complementary in shape with the male connectors. Arrangements of this kind are beneficial in that the connections resist or eliminate the potential for rotation of the male connector within the female connector and so twisting of the intermediate portion relative to the first and second end portions is resisted or eliminated. Moreover, this arrangement provides a user of the tether who is assembling the first and second ends to the intermediate portion, a clear indication of the orientation of the end portions and intermediate portions which is correct.

In some forms of the invention, the male connector of the intermediate portion or the first and second end portions can have a tongue component having a width dimension that is greater than a thickness dimension and which is received in the opening of the female connectors. In this arrangement, either of the tongue component or the inner wall of the opening of the female connectors can include a recess and the other can include a projection, whereby receipt of the projection within the recess connects the male and female connectors together. Where the recess is provided within the opening of the female connectors, the recess can be inboard of the open end of the openings of the female connectors so that the openings expand inboard of the open end. It is the expanded inboard section of the openings that the projection of the recess can engage for mating connection of the male/female connectors.

It is of course possible for the female connectors to include a projection and for the male connector to include a recess, but prototypes tested to date have included a tongue component in the male connector which includes an upstanding or outwardly extending projection and the mating connection formed between the male and female connectors has been found to provide secure connection up to the predetermined release load, and then to release appropriately at that load.

In the above arrangement in which the male connector includes a tongue component, the leading end of the tongue component can be tapered to facilitate entry into the opening of the female connector. Thus, the taper at the leading end can taper from a narrow width at the leading edge to a broader width inboard of the leading edge. The outwardly extending projection can be at the leading edge or inboard of the leading edge.

A projection can also be provided on a male connector that is not formed as a tongue component as described above. According to the invention therefore, male connectors can be provided as part of the intermediate portion or the first and second end portions and the male connectors can have any shape or geometry and can include a projection for receipt within a recess.

The height or extent of the projection outwardly or away from the male connector it extends from can vary and be selected as required.

In order to facilitate ease of connection between the connectors of the first and second end portions and the intermediate portion to form the safety breakaways, the part of the intermediate portion adjacent the connectors can present an inclined surface for finger engagement (whereby "finger" includes a thumb). The inclined surface can be a surface that can be pushed to more easily make the mating connection and this reduces the pinching load that is otherwise required of a person assembling the tether if the inclined surface is not provided. The inclined surface is preferably provided on each side of the part of the intermediate portion adjacent the connectors and the inclined surface or surfaces would be from a first thickness to a second thickness, whereby the second thickness is most adjacent or closest to the connector and is of greater thickness than the first thickness. This arrangement most particularly applies to intermediate portions that are configured to be of generally constant width and thickness between the connectors.

It will be evident from the discussion above that the tether according to the invention can be of generally constant width and thickness along its length other than at the safety breakaways and except at the distal ends of the first and second end portions.

Other characteristics of a safety tether according to the invention include that the first and second end portions and the intermediate portion can be of generally the same length and in prototypes tested to date, that length is about 250 mm. The first and second end portions can also be identical and thus can be formed from the same mould. The intermediate portion has a different construction to the first and second end portions.

It is also the case that the first and second end portions can be of unitary construction, as can the intermediate portion. This advantageously means that the first and second end portions can be a single moulded component, while the intermediate portion can also be a single moulded component. This minimises manufacturing complexity and also means that aesthetically, the respective end portions and intermediate portion can be formed of the same material and in the same colour.

A tether according to the present invention can have other forms. In all forms of the invention, the tether has the following basic form comprising:
  a. first and second elongate and flexible end portions having proximal and distal ends, and
  b. an elongate and flexible intermediate portion,
  c. the intermediate portion being releasably connectable with the first and second end portions by the intermediate portion having connectors at either end and the first and second end portions having connectors at respective proximal ends to form first and second safety breakaways,
  d. the first and second end portions being arranged for connection to a respective object,
  e. whereby the safety breakaways between intermediate portion and the first and second end portions are releasable at a predetermined release load.

In further forms of a tether according to the present invention, the tether can take the above basic form and can include alternatives discussed above in relation to the first form of the invention. Thus, for example, a further form of the invention can be embodied in combining the basic form of the tether with the first and second end portions being of unitary construction, and/or that the intermediate portion is of unitary construction. Alternatively, a further form of the invention can be embodied in combining the basic form of the the tether with the intermediate portion and the first and second end portions being of the same material. Indeed, the present invention can be embodied in combinations of the basic form of the the tether with any one or more of the alternatives given for the first form of the invention.

BRIEF DESCRIPTION OF DRAWINGS

In order that the invention may be more fully understood, some embodiments will now be described with reference to the figures in which:

FIG. 3 is an assembled view of the tether of FIG. 1.

FIG. 4 is a disassembled view of the tether of FIG. 1.

FIG. 5 is a plan view of the tether of FIG. 4.

FIGS. 6 and 8 are cross-sectional disassembled detailed views of the breakaway connection shown in FIG. 3 shown in side and plan view.

FIGS. 7 and 9 are cross-sectional assembled detailed views of the breakaway connection shown in FIG. 3 shown in side and plan view.

FIGS. 10 and 11 are top and side views of the tether of FIG. 3.

DETAILED DESCRIPTION

Figure 1:
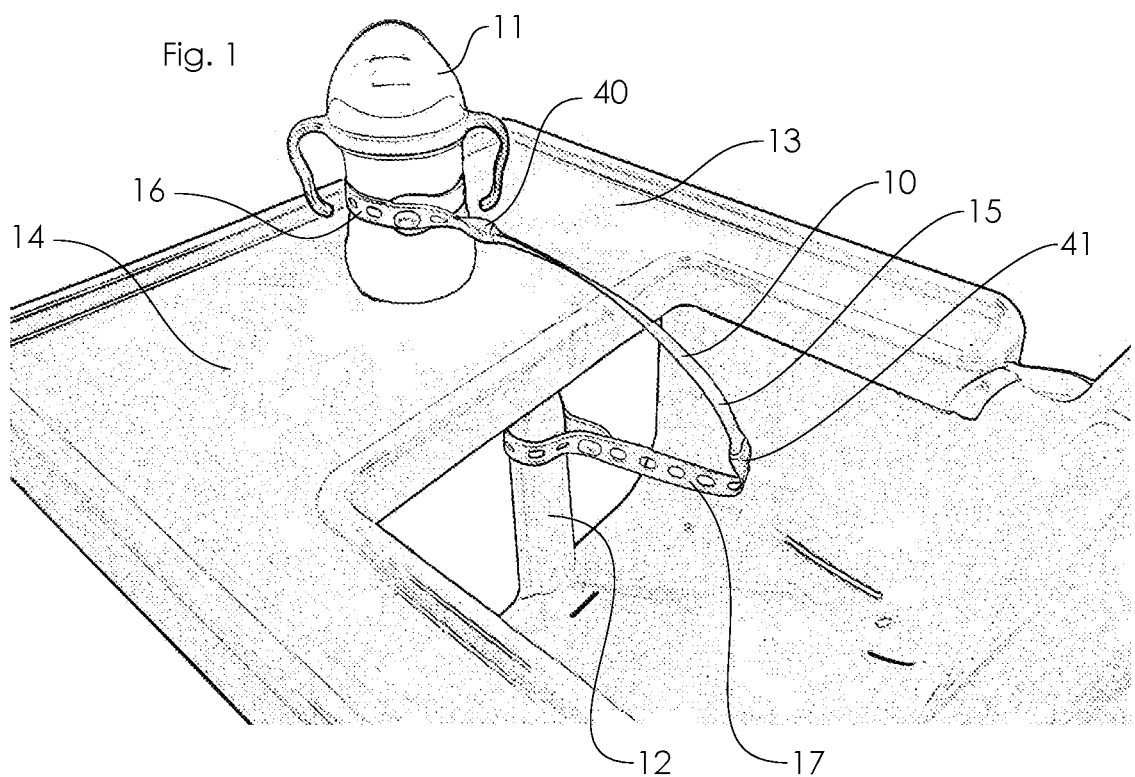
FIG. 1 is a view of tether according to the present invention in use connected to an infant's cup and to a strut of a high-chair.

FIG. 1 is a sketch of the tether 10 of the present invention connected to an infant's cup 11 and a strut 12 of a high-chair 13. FIG. 1 illustrates just one use of the tether 10 of the present invention. The tether 10 comprises an intermediate portion 15 and first and second end portions 16 and 17. The overall construction of the tether 10 will be described hereinafter in more detail, but FIG. 1 shows how the end portion 16 can extend or loop about and connect to the body of the cup 11, while the end portion 17 extends or loops about and connects to the strut 12.

Figure 2:
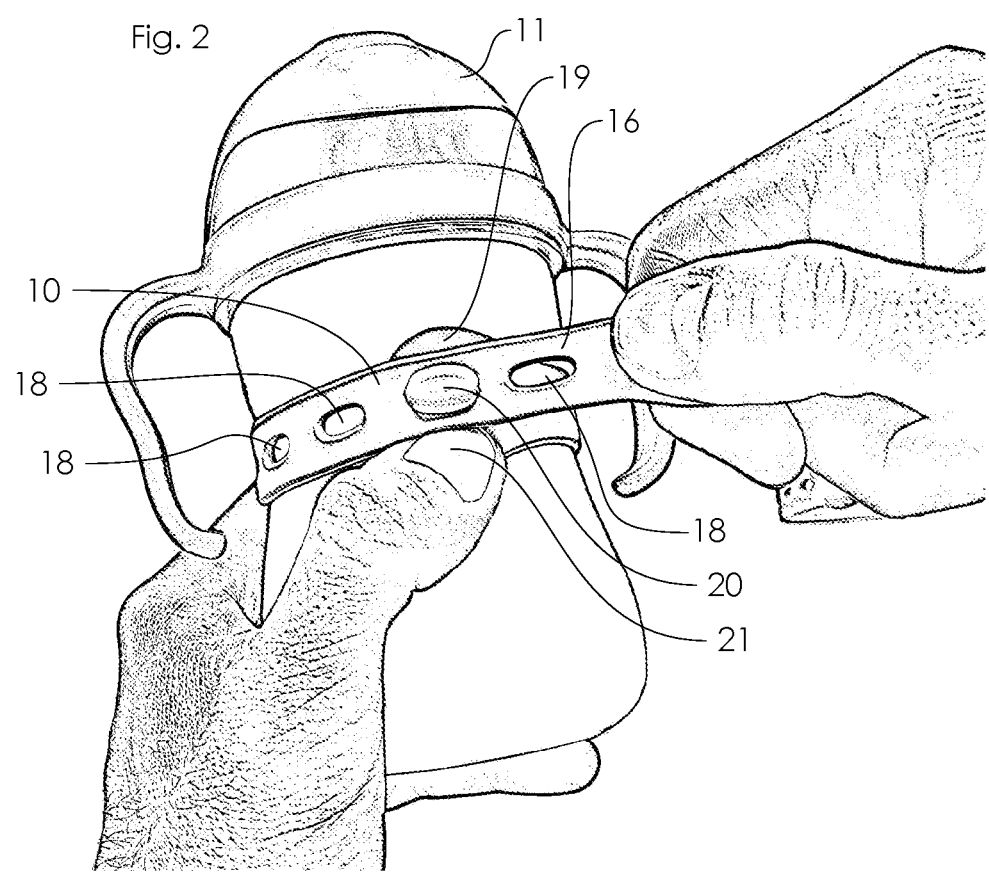
FIG. 2 shows in closer detail, the cup of FIG. 1 in connection with the tether.

FIG. 2 shows in closer detail, the cup 11 with the end portion 16 looped about it. In the end portion 16, it can be seen that a plurality of openings 18 are provided, with each of the openings 18 being longer than wide and thus formed in a generally oval shape. A distal end 19 of the end portion 16 is formed to have a round shape and thus has a diameter which is of greater width than the portion of the end portion 16 in which the openings 18 are formed, which is of generally constant width and thickness. The distal end 19 includes a male connector 20 that extends into one of the openings 18 to form the loop which is shown. It can also be seen that the thumb 21 of the hands which are applying the end portion 16 about the cup 11 is pressing on the exposed and wider portion 19 to push it against the surface of the cup 11 and thus locate it, in order to assist entry of the male connector 20 through the selected opening 18.

FIGS. 3 and 4 show the tether 10 in assembled and disassembled forms respectively. FIGS. 3 and 4 thus show each of the features described in FIGS. 1 and 2 while FIGS. 3 and 4 show further openings 22 in the end portion 17 and a male connector 24 associated with the distal end 23.

FIG. 4 clearly shows that the intermediate portion 15 includes male connectors 30 at each end for insertion into female openings 31 formed in the proximal ends 32, 33 of the end portions 16 and 17. It will be clear however, that these could be reversed so that the male connectors extended from the end portions 16 and 17 and the intermediate portion 15 included female openings at each end.

Each of the male connectors 30 and the female openings 31 have a width dimension as clearly shown in FIGS. 8 and 9, that is greater than the thickness dimension as shown in FIGS. 6 and 7. This geometry of the male connectors 30 and the female openings 31 tends to resist the male connector 30 twisting within the female opening 31 about the lengthwise axis of the tether 10 (see axis A shown in FIG. 6).

The connectors 30 are formed as a tongue which includes a leading edge 35 and a projection 36 rearward of the edge 35. In the form illustrated, the projection 36 extends completely about the connector 30 and is provided for receipt within a complementary recess 37 within the female opening 31. The recess 37 is inboard of the opening 38 of the female opening 31. FIGS. 7 and 9 show the connector 30 inserted into the opening 31 and shows the close mating arrangement between those two components. FIGS. 8 and 9 show the arrangements of FIGS. 6 and 7 in views perpendicular thereto and from all of these figures, the complementary shape of the opening 31 relative to the connector 30 can be seen.

FIGS. 8 and 9 show that the connector 30 has a tapered leading end, which tapers from the leading edge 35 rearwardly to the projection 36. This tapering assists to align and insert the connector 30 into the opening 31.

It will be evident from the figures that the connectors 30 of the intermediate portion 15 can be pushed into the openings 31 of the proximal ends 32, 33 and once the projection 36 is received within the recess 37, the connection is made. The connections are made in-line with the general lengthwise axis of the tether. The connections are not made laterally to the general lengthwise axis of the tether, as is the case, for example, in U.S. Pat. No. 9,474,357. The connection is such as to form a safety breakaway, so that the connection is a releasable connection upon a sufficient release load being applied to the connected parts in a direction opposite to the insertion direction of the connector 30 into the opening 31.

FIGS. 10 and 11 are top and side views respectively of the FIG. 3 illustration of the tether 10. The tether 10 is shown aligned along its lengthwise axis, although it should be appreciated that the tether 10 is shown in this orientation for descriptive purposes only given that the flexible nature of the intermediate portion and the first and second end portions would normally mean that the resting configuration of the tether 10 would not be a straight configuration. Thus, FIGS. 10 and 11 show the end portions 16 and 17 in connection with the intermediate portion 15. From these figures, it can be seen that the tether 10 has a generally constant width and thickness as shown by W and T in FIGS. 10 and 11, throughout the major portion of its length. This is with the exception of the safety breakaways at 40 and 41 and at the distal ends 19 and 23 of the end portions 16 and 17. With a specific reference to the breakaways 40 and 41, it can be seen that these taper or incline on either side from the minimum thickness T to a maximum thickness M. The tapering occurs in both of the width and thickness directions. This arrangement advantageously presents an inclined surface for finger engagement in order for a person assembling the tether 10 from the disengaged condition shown in FIG. 4, to the assembled or engaged position shown in FIG. 3. Thus, the proximal end 32 of the end portion 16 can be gripped between thumb and finger on the inclined surface 42 (see FIG. 4), while the intermediate portion can be gripped between a thumb and finger on the inclined surface 43. These inclined surfaces assist assembly of the tether 10.

Once the tether 10 has been assembled as shown in FIG. 3, it can be applied to objects such as the cup 11 and high-chair 13 shown in FIG. 1. As shown in FIG. 1, the loop which is applied to the cup 11 by folding over the distal end 19 of the end portion 16, is folded over in a different direction to the distal end 23 of the end portion 17. However, either arrangement is appropriate as the male connectors 20 and 24 can be inserted into the openings 18 and 22 in either folding over direction.

It is also evident from the figures, that the end portions 16 and 17 are identical and so could be formed from the same mold and from the same material. Likewise, length of the intermediate portion 15 and the end portion 16 and 17 are about the same length and, in prototypes made to date, the length of each is about 250 mm.

Returning to FIG. 1, if an infant or toddler were to push or throw the cup 11 from the supporting surface 14 of the high-chair 13, the cup 11 would not fall very far because of its connection by tether 10, to the strut 12. The cup 11 would certainly not land on the floor. The relevant carer can therefore easily grasp the cup 11 and place it back on the supporting surface 14. However, if in playing or manipulating the cup 11, the toddler were to become entangled, a release load that could be applied by the toddler would see one or both of the safety breakaways 40 and 41 release, thereby relieving the entanglement.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A tether for connecting two different objects together, the tether having:
   a. first and second elongate and flexible end portions each having a generally constant width and thickness between proximal and distal ends of each of the first and second elongate and flexible end portions, and a width of a distal end of at least one of the first and second elongate and flexible end portions being greater than a width between the proximal and the distal ends,
   b. an elongate and flexible intermediate portion,
   c. the elongate and flexible intermediate portion being releasably connectible with the first and second elongate and flexible end portions by the elongate and flexible intermediate portion having connectors at either end and the first and second elongate and flexible end portions having connectors at respective proximal ends to form first and second safety breakaways, connections of the first and second safety breakaways being made in-line with a general lengthwise axis of the tether,
   d. the first and second end elongate and flexible portions being arranged for connection to a respective object,
   e. whereby the safety breakaways between the elongate and flexible intermediate portion and the first and second elongate and flexible end portions are releasable at a predetermined release load.

2. The tether according to claim 1, wherein the connectors of the elongate and flexible intermediate portion are male connectors having a width dimension that is greater than a thickness dimension and the connectors of the first and second elongate and flexible end portions are female connectors including openings for accepting the male connectors.

3. The tether according to claim 2, wherein the openings of the female connectors are generally complementary in shape with the male connectors.

4. The tether according to claim 2, wherein the male connectors have a tongue component having a width dimension that is greater than a thickness dimension and which is received in the openings of the female connectors, and one of the tongue components or the openings of the female connectors includes a recess and another includes a projection, whereby receipt of the projection within the recess connects the male connectors to the female connectors.

5. The tether according to claim 4, wherein the female connectors include the recess inboard of an open end of the openings and the tongue component include the projection.

6. The tether according to claim 5, wherein the projection is upstanding from the tongue component along the thickness dimension.

7. The tether according to claim 5, wherein the projection extends completely about the tongue component.

8. The tether according to claim 4, wherein the tongue component has a tapered leading end, tapering from a narrow width at a leading edge of the tapered leading end, to a broader width inboard of the leading edge.

9. The tether according to claim 1, wherein the first and second elongate and flexible end portions and the elongate and flexible intermediate portion are formed of a flexible rubber.

10. The tether according to claim 9, wherein the flexible rubber is selected from thermoplastic elastomers, rubbers, thermoplastic polyurethane or silicone.

11. The tether according to claim 1, wherein at least one of the first and second elongate and flexible end portions is arranged for connection to a respective object by the distal end of the at least one of the first and second elongate and flexible end portions folding over and connecting to the tether inboard of the distal end.

12. The tether according to claim 11, wherein the tether includes a plurality of openings formed inboard of the distal end of one or each of the first and second elongate and flexible end portions and at least one of the distal ends includes a male connector for insertion into an opening of the plurality of openings to form a loop for connection to or about an object.

13. The tether according to claim 12, wherein the plurality of openings is formed generally in a line lengthwise of the tether.

14. The tether according to claim 1, wherein the distal end having a greater width than the width of the first and second elongate and flexible end portions between the proximal and the distal ends is formed as a generally round end.

15. The tether according to claim 1, wherein the elongate and flexible intermediate portion adjacent the connectors presents an inclined surface for finger engagement.

16. The tether according to claim 15, wherein the inclined surface is provided on opposite sides of the elongate and flexible intermediate portion.

17. The tether according to claim 1, wherein each of the first and second elongate and flexible end portions and the elongate and flexible intermediate portion are of generally a same length.

18. The tether according to claim 1, wherein material of the first and second elongate and flexible end portions and the elongate and flexible intermediate portion are resistant to twisting.

19. The tether according to claim 1, wherein the first and second elongate and flexible end portions and the elongate and flexible intermediate portion are of unitary construction.

\* \* \* \* \*